United States Patent
Poster

(10) Patent No.: US 9,206,944 B2
(45) Date of Patent: Dec. 8, 2015

(54) LUBRICATION SYSTEM WITH PASSIVE DRAIN VALVE

(71) Applicant: Bell Helicopter Textron Inc., Fort Worth, TX (US)

(72) Inventor: Scott Poster, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 399 days.

(21) Appl. No.: 13/794,063

(22) Filed: Mar. 11, 2013

(65) Prior Publication Data

US 2014/0251732 A1 Sep. 11, 2014

(51) Int. Cl.
*F16N 13/22* (2006.01)
*F01M 11/00* (2006.01)
*F16H 57/04* (2010.01)
*B64C 27/12* (2006.01)
*F01M 11/12* (2006.01)

(52) U.S. Cl.
CPC ............... *F16N 13/22* (2013.01); *B64C 27/12* (2013.01); *F01M 11/0004* (2013.01); *F16H 57/0447* (2013.01); *F01M 11/12* (2013.01)

(58) Field of Classification Search
CPC ...................................................... F16N 13/22
USPC ................... 184/6.12, 6.22, 26, 104.2, 106
See application file for complete search history.

(56) References Cited

U.S. PATENT DOCUMENTS

| | | | | |
|---|---|---|---|---|
| 4,114,571 A | * | 9/1978 | Ruf | 123/41.35 |
| 5,217,085 A | * | 6/1993 | Barrie et al. | 184/104.1 |
| 7,654,241 B2 | * | 2/2010 | Kobayashi et al. | 123/195 C |
| 8,020,666 B2 | * | 9/2011 | Yamashita et al. | 184/6.24 |
| 2008/0210491 A1 | * | 9/2008 | Mori et al. | 184/106 |
| 2009/0014248 A1 | * | 1/2009 | Yamashita et al. | 184/6.24 |
| 2011/0210179 A1 | | 9/2011 | Moser et al. | |

FOREIGN PATENT DOCUMENTS

| | | |
|---|---|---|
| DE | 102005005154 A1 | 8/2006 |
| EP | 1983164 A1 | 10/2008 |
| KR | 20080038749 A | 5/2008 |

OTHER PUBLICATIONS

European Search Report for related EP Application No. 14157077.0, Apr. 14, 2014, 3 pages, European Patent Office.
Abstract KR 20080038749, obtained from Espacenet on Apr. 25, 2014, 1 page.
Abstract DE 102005005154, obtained from Espacenet on Apr. 25, 2014, 1 page.

* cited by examiner

*Primary Examiner* — William E Dondero
*Assistant Examiner* — Robert T Reese
(74) *Attorney, Agent, or Firm* — Klemchuk LLP; Kirby B. Drake

(57) ABSTRACT

A lubrication system is disclosed. The lubrication system may have a collection area for collecting lubricating media and a pumping system for transporting the lubricating media from a withdrawal location of the collection area to a distribution location of the collection area. The lubricating media may collect in the collection area to a static level when the pumping system is off and to a dynamic level when the pumping system is on. The lubrication system may also include a drain valve located between the static level and the dynamic level. The drain valve may operable to open to drain a portion of the lubricating media in response to the lubricating media reaching a predefined threshold temperature and level. The valve may comprise a thermally-activated material, and the material may substantially change phase or volume upon reaching a predetermined temperature.

12 Claims, 7 Drawing Sheets

LUBRICATION SYSTEM WITH PASSIVE DRAIN VALVE

FIELD OF THE INVENTION

The present disclosure generally relates to a lubrication system, and more particularly, to a lubrication system having a passive drain valve for preventing submersion of a mechanical assembly in the event of system failure.

BACKGROUND

A lubrication system may be used for lubricating and cooling a mechanical assembly. Some lubrication systems employ a cycle wherein a lubricating media, such as oil, is distributed onto portions of the mechanical assembly that are susceptible to friction. Such lubrication systems may comprise a collection area to contain the lubricating media and a pumping mechanism coupled to the collection area. The lubricating media is stored in the collection area, and the pumping mechanism pumps the lubricating media to be distributed onto portions of the mechanical assembly. If the pumping mechanism fails, hot lubricating media may accumulate in the collection area and possibly submerge mechanical assembly components proximate thereto.

SUMMARY

Embodiments of the present disclosure generally provide a lubrication system having a collection area for collecting lubricating media, and a pumping system for transporting the lubricating media from a withdrawal location of the collection area to a distribution location of the collection area. The lubricating media may collect in the collection area to a static level when the pumping system is off and to a dynamic level when the pumping system is on. The lubrication system may also include a drain valve located between the static level and the dynamic level. The drain valve may be operable to open in order to drain a portion of the lubricating media in response to the lubricating media reaching a predefined threshold temperature and level. In an embodiment, the valve may comprise a thermally-activated material. The material may substantially change phase or volume upon reaching a predetermined temperature.

Embodiments of the present disclosure also generally provide a lubrication system having a collection area for collecting lubricating media, a pumping system for transporting the lubricating media from a withdrawal location of the collection area to a distribution location of the collection area; and a drain valve located above the normal operating level of the lubricating media. The drain valve may open to drain a portion of the lubricating media in response to the lubricating media reaching a predefined threshold temperature and level.

Embodiments of the present disclosure also generally provide a lubrication system having a drain valve coupled to a collection area for collecting lubricating media, and the drain valve including a material that changes phase or volume at a predefined threshold temperature. The drain valve may open to drain a portion of the lubricating media from the collection area in response to the material reaching the predefined threshold temperature. The drain valve may further include a casing with a valve seat opening and a valve plug. The valve plug may seal with the valve seat opening to close the valve when the temperature of the material is below the predefined threshold temperature, and the valve plug may unseal from the valve seat opening to open the valve when the temperature of the material is at or above the predefined threshold temperature. The drain valve may further include a spring that biases the valve plug to unseal from the valve seat opening to open the valve when the temperature of the material is at or above the predefined threshold temperature. In an embodiment, the spring is formed of the material.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
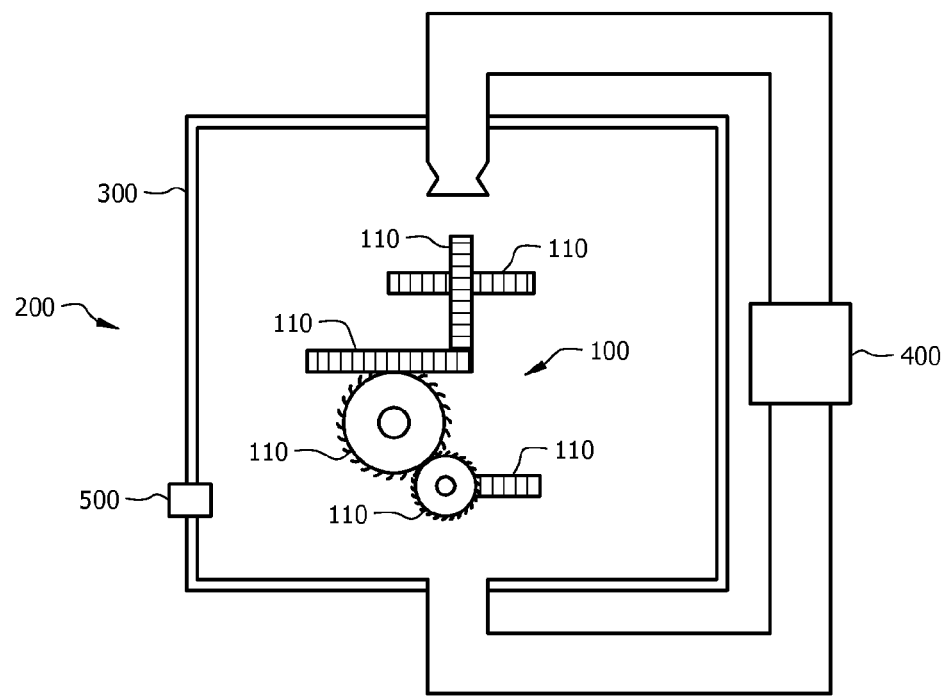
FIG. 1 depicts a side cutaway view of a lubrication system according to an embodiment of the present disclosure.

Embodiments of the present disclosure generally provide a lubrication system for lubricating and cooling a mechanical assembly. As described herein, the lubrication system may comprise one or more passive drain valves for draining a portion of the lubricating media 120 in the event of pump failure, thereby preventing hazardous immersion of the mechanical assembly. In an embodiment of the lubrication system, one or more passive drain valves may be located above a dynamic operating level, and below a static non-operating level, of the lubricating media 120. In an embodiment, a drain valve will fail open, thereby preventing hazardous immersion of the mechanical assembly in the event of drain valve failure. In another embodiment, a drain valve may comprise thermally activated media operable to open the drain valve, and the drain valve may be constructed to prevent the media from entering the lubrication system upon actuation.

FIGS. 1-8B illustrate representative configurations of lubrication system 200 and parts thereof. It should be understood that the components of lubrication system 200 and parts thereof shown in FIGS. 1-8B are for illustrative purposes only, and that any other suitable components or subcomponents may be used in conjunction with or in lieu of the components comprising lubrication system 200 and parts thereof described herein.

A lubrication system 200 according to the present disclosure may be used in the operation of a variety of mechanical assemblies 100 including, but not limited to, power generation or transfer devices, such as gearboxes, transmissions, and engines. Friction between moving components in these mechanical assemblies 100, such as friction created by high-speed spinning gears 110, generates heat that may damage components therein. Some lubrication systems employ a cycle in which a lubricating media 120, such as oil, is first distributed onto components susceptible to friction, then gathers in a collection area where it is then pumped back to a location where it may be redistributed back onto the components. If the pumping mechanism fails, hot lubricating media 120 may accumulate in the collection area and possibly submerge components proximate thereto, causing damage and potential failure of the mechanical assembly 100. It is desirable to drain this hot lubricating media 120 from the collection area prior to it reaching a hazardous level. Some lubrication systems employ an electromechanically actuated valve that may drain the hot lubricating media 120 from the collection area in the event of pump failure. In such systems, a sensor may be used to detect pump failure and trigger the valve to open. In operation, electromechanically actuated valves may require time to run a BIT check upon startup and may be susceptible to failure, resulting in frequent maintenance, replacement, and system downtime. Electromechanically actuated valves may also be heavy, resulting in reduced performance if used in vehicle applications such as fixed-wing and rotary-wing aircraft.

The present disclosure is directed to a lubrication system 200 for lubricating and cooling a mechanical assembly 100. Embodiments of lubrication system 200 may provide for passively detecting and abating an accumulation of, and hazardous temperature increase in, lubricating media 120 within the lubrication system 200. Embodiments may also provide for simple, lightweight, low maintenance, and substantially failsafe systems for draining hazardous lubricating media 120 before reaching levels that may damage components of the mechanical assembly 100.

FIG. 1 depicts a representative lubrication system 200 for a mechanical assembly 100, the lubrication system 200 comprising a collection area 300, a pumping mechanism 400, and one or more passive drain valves 500, as described in more detail herein.

Figure 2:
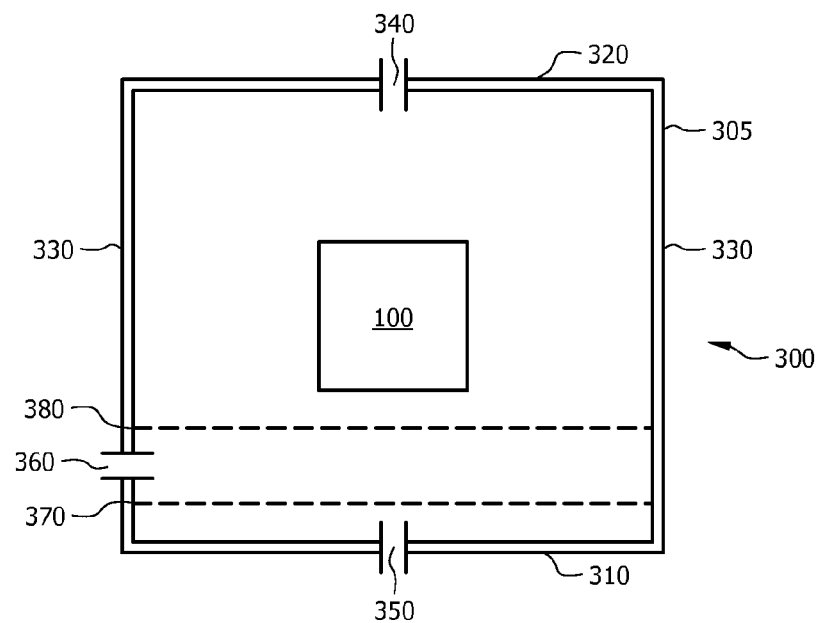
FIG. 2 depicts a side cutaway view of a collection area of the lubrication system according to an embodiment of the present disclosure.

FIG. 2 depicts an isolated side cutaway view of the collection area 300 of lubrication system 200. Collection area 300 may comprise a housing 305 having a bottom 310, a top 320, and sides 330, and housing 305 may be any suitable size, shape, material, and construction capable of containing a mechanical assembly 100 and collecting any lubricating media 120 distributed to and/or shed therefrom. Collection area 300 may further comprise one or more inlet ports 340, one or more outlet ports 350, and one or more drain valve ports 360. Inlet port 340 may be positioned in any location along the surface of housing 305 of collection area 300 from which lubricating media 120 may be sufficiently distributed to a mechanical assembly 100 disposed therein. In an embodiment, inlet port 340 is located along the top 320 of housing 305 of collection area 300 such that gravity may assist in distributing any lubricating media 120 entering therefrom to the components of the mechanical assembly 100. Outlet port 350 may be positioned in any location along the surface of housing 305 of collection area 300 from which lubricating media 120 may be sufficiently withdrawn from the collection area 300. In an embodiment, outlet port 350 is located along the bottom 310 of housing 305 of collection area 300 such that gravity may cause lubricating media 120 to collect proximate to outlet port 350. Drain valve port 360 may be positioned along a side surface 330 of housing 305 of collection area 300, and located above a predetermined dynamic operating level 370 and below a predetermined static level 380, as described in more detail herein.

Figure 3:
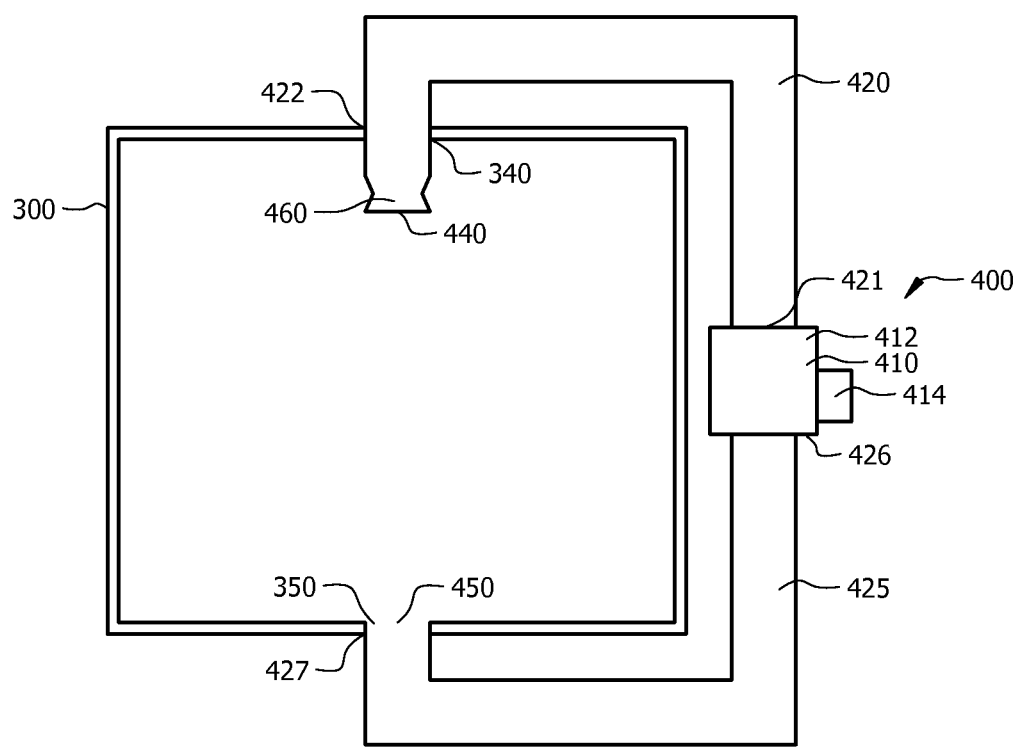
FIG. 3 depicts a side cutaway view of a pumping system coupled to a collection area of a lubrication system according to an embodiment of the present disclosure.

Referring now to FIG. 3, lubrication system 200 may further comprise a pumping system 400 coupled to collection area 300. Pumping system 400 may comprise a pumping mechanism 410 coupled to upper and lower conduits 420, 425 comprising a suction line 425 and a discharge line 420. Pumping mechanism 410 may comprise any suitable mechanism capable of transporting lubricating media 120 from a withdrawal location 450 through conduits 425 and 420 to a distribution location 440. Conduits 425 and 420 may establish fluid communication between pumping mechanism 410 and withdrawal/distribution locations 450/440, respectively. Pumping system 400 may further comprise one or more distribution mechanisms 460 coupled to distribution location(s) 440. A distribution mechanism 460 may comprise any suitable device known in the art that may direct or manipulate the flow of lubricating media 120 passing therethrough, such as a spray nozzle. In an embodiment, pumping mechanism 410 comprises a pump 412 mechanically or electrically driven by a gearbox or an electric motor 414, respectively. The pump 412 may be fixedly coupled to the proximate ends 421, 426 of the conduits 420, 425, respectively, with distal end 427 of conduit 425 fixedly coupled to a withdrawal location 450, and with distal end 422 of conduit 420 fixedly coupled to a nozzle 460 positioned at distribution location 440. Withdrawal location 450 and distribution location 440 may coincide with and couple to inlet port 340 and outlet port 350 of collection area 300, respectively.

Figure 4A:
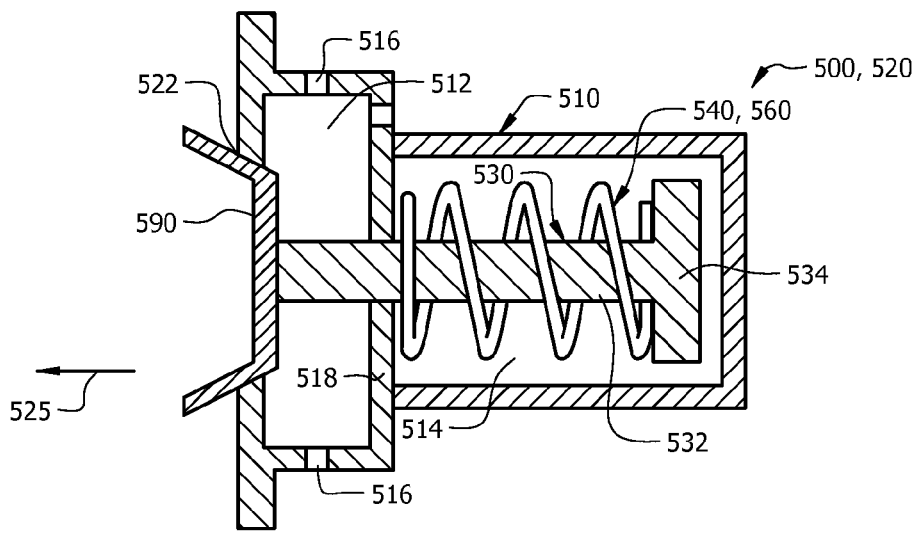
FIGS. 4A to 4C depict side cutaway views of representative passive drain valves, respectively, for use in a lubrication system according to various embodiments of the present disclosure.
Figure 4B:
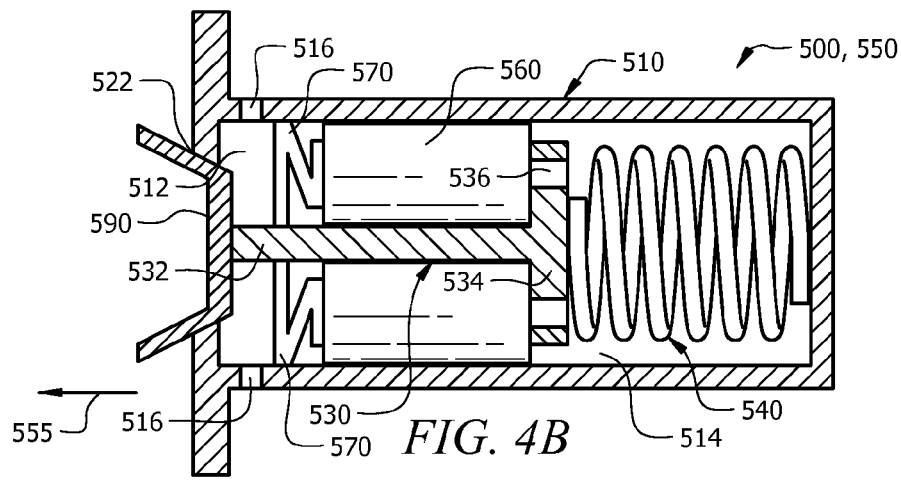
Figure 4C:
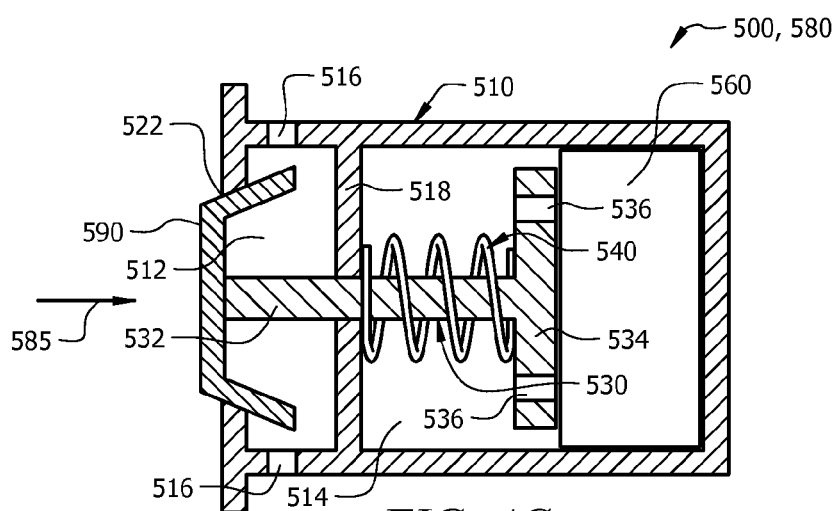

Referring now to FIG. 4A to 4C, lubrication system 200 may further comprise one or more passive drain valves 500, such as valve 520 shown in FIG. 4A, valve 550 shown in FIG. 4B, and valve 580 shown in FIG. 4C, with like reference numerals representing like components. In operation, the one or more passive drain valves 500 may drain a portion of the lubricating media 120 from the collection area 300 in the event that the lubricating media 120 raises to a predetermined level and predetermined threshold temperature in the collection area 300, as may happen in the event of pump mechanism 410 failure.

Each of passive drain valves 520, 550, and 580 comprises: a two-chamber casing 510 having an outer chamber 512 with ports 516 leading thereto and an inner chamber 514, a piston 530 having a piston shaft 532 and a plunger 534, a spring 540, and a valve plug 590 coupled to the piston shaft 532. Valve 550 shown in FIG. 4B further comprises two sections of material 560 biased against the plunger 534 by Belleville washers 570, and valve 580 shown in FIG. 4C likewise comprises a section of material 560 positioned between the plunger 534 and the end of inner chamber 514. The inner chamber 514 of each valve 520, 550, 580 provides a physical barrier to prevent the plunger 534, the spring 540, and/or the material 560 from exiting into the outer chamber 512 or escaping outside of the casing 510.

Referring again to FIG. 4A, the passive drain valve 520 is shown in the closed position. In the closed position, the force of spring 540 acts against a wall 518 separating chambers 512, 514 of the casing 510 on one end, and the force of spring 540 acts against the plunger 534 on the other end, thereby biasing the piston 530 to the end of inner chamber 514 and retracting the valve plug 590 to seal against a valve seat opening 522 in the casing 510 that leads to outer chamber 512. In an embodiment, spring 540 comprises a material 560 that changes properties with temperature. In an embodiment, spring 540 comprises a bi-metallic material that changes volume with temperature, thereby altering the spring rate of spring 540.

Valve 520 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 520 will also rise, including spring 540. As the temperature of spring 540 rises, the material 560 comprising the spring will respond by changing volume, thereby altering the spring rate of spring 540. As the spring rate is altered, the lubricating fluid 120 acting on valve plug 590 may overcome the bias force of spring 540, which in turn may cause the valve plug 590 and piston 530 to move in the direction of the arrow 525 shown in FIG. 4A. When the valve plug 590 moves in the direction of arrow 525, it will unseal from the valve seat opening 522 and allow a portion of the lubricating media 120 in outer chamber 512 to drain out. Thus, in this manner, valve 520 is designed to actuate open in the event of pump mechanism 410 failure.

Referring now to FIG. 4B, the passive drain valve 550 is shown in the closed position. In the closed position, the Belleville washers 570 exert a force that acts against sections of material 560 engaging one side of plunger 534, whereas the spring 540 exerts a force that acts against the opposing side of plunger 534, thereby biasing the piston 530 to a position within inner chamber 514 where the valve plug 590 is retracted to seal against the valve seat opening 522 in the casing 510 that leads to outer chamber 512. In an embodiment, material 560 changes properties with temperature. In an embodiment, material 560 changes phase, such as from solid to liquid, at a predetermined threshold temperature. In an embodiment, material 560 comprises a eutectic material. In an embodiment, material 560 comprises lead or tin.

Valve 550 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 550 will also rise, including sections of material 560. As the temperature of sections of material 560 crosses the predetermined threshold temperature, the material 560 will respond by changing phase from solid to liquid. As the material 560 is transformed into a liquid, the liquid material 560 will flow through openings 536 in the plunger 534 and there will be nothing solid for the Belleville washers 570 to act against. As such, the bias force of spring 540 acting against plunger 534 may cause the valve plug 590 and piston 530 to move in the direction of the arrow 555 shown in FIG. 4B. When the valve plug 590 moves in the direction of arrow 555, it will unseal from the valve seat opening 522 and allow a portion of the lubricating media 120 in outer chamber 512 to drain out. Thus, in this manner, valve 550 is designed to actuate open in the event of pump mechanism 410 failure.

Referring now to FIG. 4C, the passive drain valve 580 is shown in the closed position. In the closed position, the spring 540 exerts a force that acts against the wall 518 separating the chambers 512, 514 of casing 510 on one end, and the spring 540 exerts a force that acts against the plunger 534 on the other end. The force of spring 540 biases the piston 530 to a position within inner chamber 514 where the valve plug 590 is retracted to seal against the valve seat opening 522 in the casing 510 that leads to outer chamber 512, and the plunger 534 engages a section of material 560 positioned between the plunger 534 and the end of inner chamber 514. In an embodiment, material 560 changes properties with temperature. In an embodiment, material 560 changes phase, such as from solid to liquid, at a predetermined threshold temperature. In an embodiment, material 560 comprises a eutectic material. In an embodiment, material 560 comprises lead or tin.

Valve 580 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 580 will also rise, including section material 560. As the temperature of section of material 560 crosses the predetermined threshold temperature, the material 560 will respond by changing phase from solid to liquid. As the material 560 is transformed into a liquid, the liquid material 560 will flow through openings 536 in the plunger 534 and there will be nothing solid for the spring-loaded plunger 534 to act against. As such, the bias force of spring 540 acting against plunger 534 may cause the valve plug 590 and piston 530 to move in the direction of the arrow 585 shown in FIG. 4C. When the valve plug 590 moves in the direction of arrow 585, it will unseal from the valve seat opening 522 and allow a portion of the lubricating media 120 in outer chamber 512 to drain out. Thus, in this manner, valve 580 is designed to actuate open in the event of pump mechanism 410 failure.

FIGS. 5A-8B illustrate representative levels and flows of lubricating media 120 in an embodiment of lubrication system 200 under various conditions. In particular, the figures represent combinations of conditions wherein mechanical assembly 100 and lubrication system 200 are in various operational states (ON/OFF), and wherein pump system 400 and drain valve 500 are in various modes (OK/FAIL).

Figure 5A:
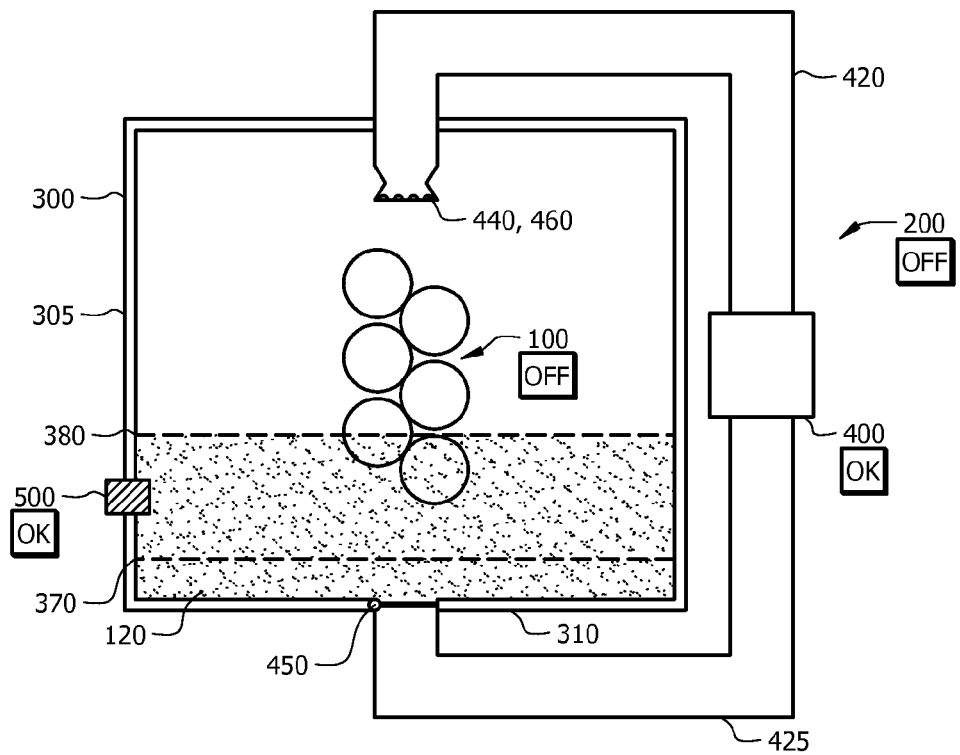
FIG. 5A depicts a side cutaway view of a lubrication system in the OFF state in which both the pumping system and the drain valve are OK according to an embodiment of the present disclosure.
Figure 5B:
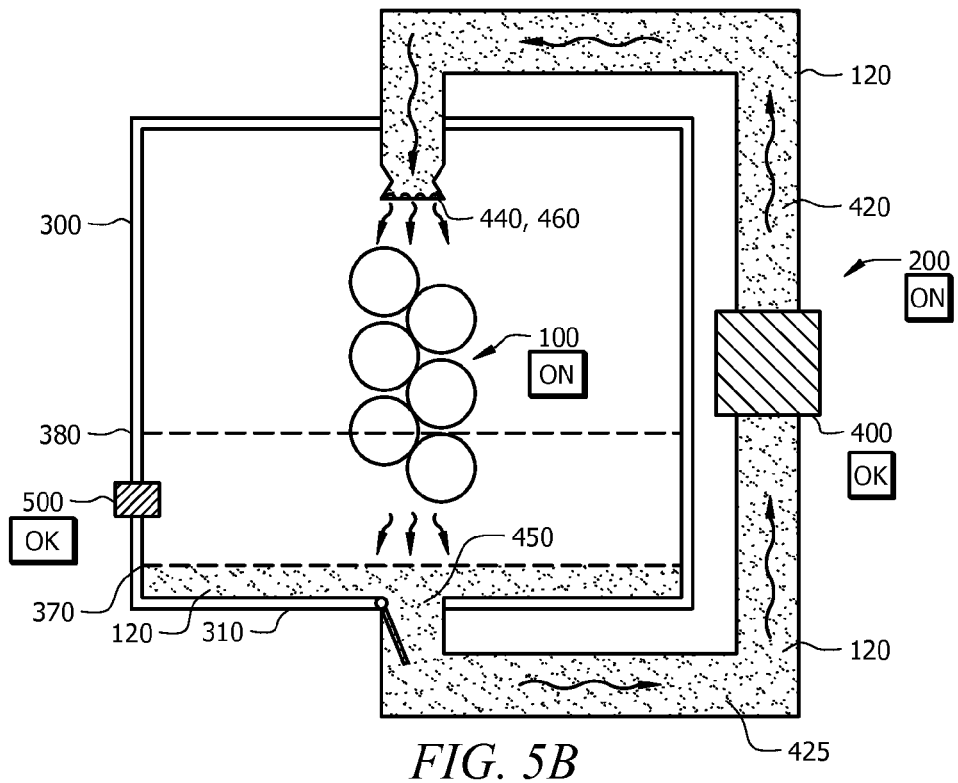
FIG. 5B depicts a side cutaway view of a lubrication system in the ON state in which both the pumping system and the drain valve are OK according to an embodiment of the present disclosure.

FIGS. 5A and 5B illustrate conditions in which both the pumping system 400 and the drain valve 500 are OK. Referring to FIG. 5A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. In this OFF state, the lubricating media 120 accumulates to a static level 380 within the collection area 300. In an embodiment, the static level 380 may be higher than the lowest portions of a mechanical assembly 100 disposed within the lubrication system 200, resulting in the lower portions possibly being submerged in the OFF state. Yet, because the mechanical assembly 100 is OFF, its moving parts are not generating frictional heat, nor are they operating whilst submerged in high-temperature lubricating media 120. In another embodiment, a separate sump for storing the lubricating media 120 may be coupled between the collection area 300 and the pumping system 400, such that a portion or substantially all of the lubricating media 120 may be stored in the separate sump when the lubrication system 200 is OFF. In this embodiment, because the mechanical assembly 100 is also OFF, its moving parts are not generating frictional heat, nor are they operating without lubrication.

Referring now to FIG. 5B, the mechanical assembly 100 and lubrication system 200 are shown in an ON state. The pumping system 400 operates to withdraw lubricating media 120 from the collection area 300 through withdrawal location 450 into suction conduit 425, and then transports the lubricating media 120 through discharge conduit 420 to distribution location 440. The lubricating media 120 is thereby distributed via distribution mechanism 460 to a mechanical assembly 100 located within collection area 300. The lubricating media 120 then drips down from mechanical assembly 100 and collects proximate to bottom 310 of housing 305. Because the pumping system 400 continuously withdraws a substantial portion of the lubricating media 120 from the bottom 310 of the housing 305 of collection area 300, the lubricating media 120 maintains a dynamic operating level 370 that is lower than the static operating level 380. Under this combination of conditions, the mechanical assembly 100 is adequately lubricated and cooled, resulting in no damage.

Figure 6A:
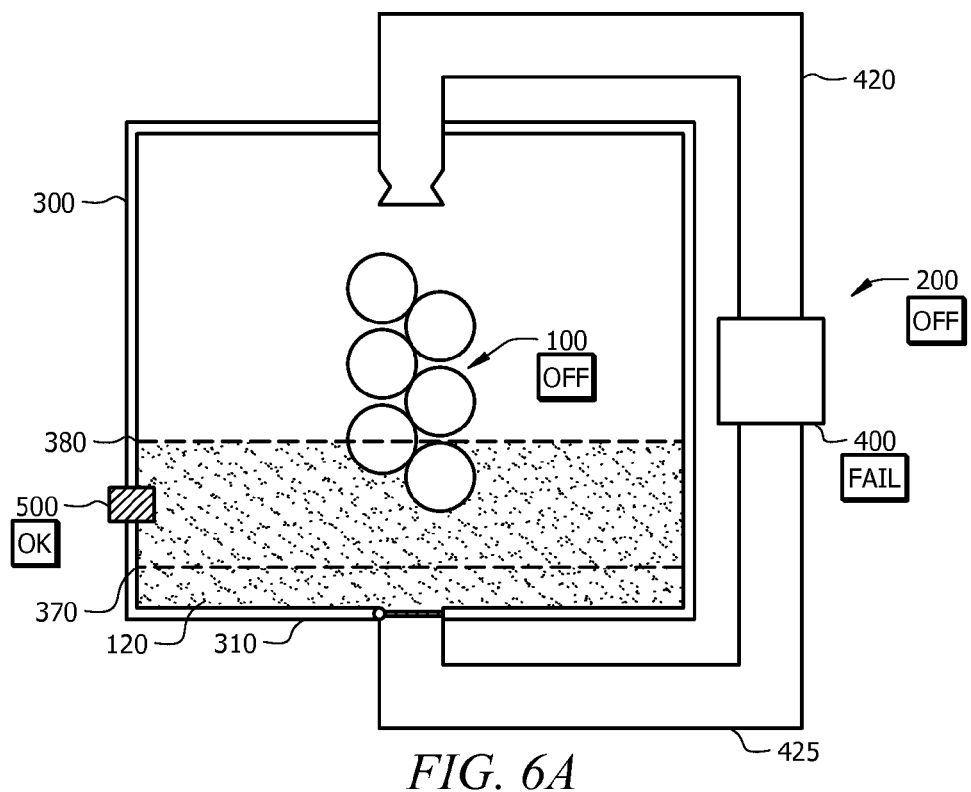
FIG. 6A depicts a side cutaway view of a lubrication system in the OFF state in which the pumping system has FAILED according to an embodiment of the present disclosure.
Figure 6B:
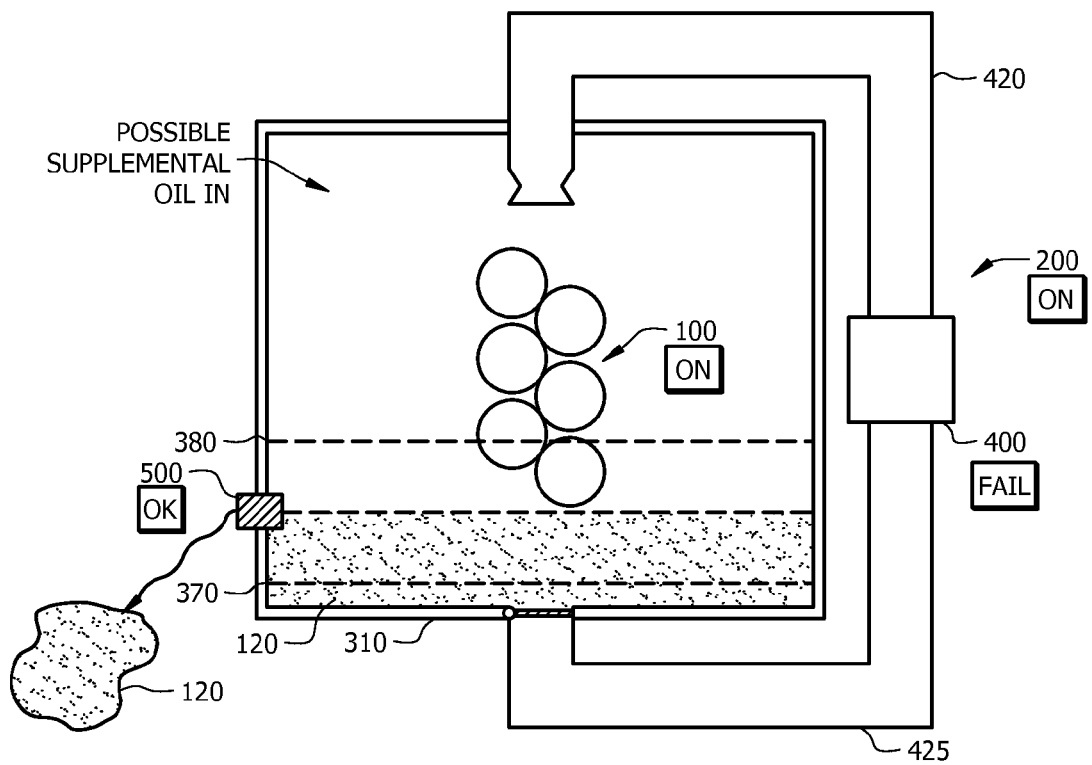
FIG. 6B depicts a side cutaway view of a lubrication system in the ON state in which the pumping system has FAILED according to an embodiment of the present disclosure.

FIGS. 6A and 6B illustrate conditions in which the pumping system 400 has FAILED and the drain valve 500 is OK. Referring to FIG. 6A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. In this OFF state, the lubricating media 120 accumulates to a static level 380 within the collection area 300. In an embodiment, the static level 380 may be higher than the lowest portions of a mechanical assembly 100 disposed within the lubrication system 200, resulting in said lower portions possibly being submerged in the OFF state. Yet, because the mechanical assembly 100 is OFF, its moving parts are not generating frictional heat, nor are they operating whilst submerged in high-temperature lubricating media 120.

Referring now to FIG. 6B, the mechanical assembly 100 and lubrication system 200 are shown in an ON state. The pumping system 400 has FAILED and is unable to pump lubricating media 120 from the collection area 300, thus hot lubricating media 120 accumulates and rises toward the mechanical assembly 100. If the hot lubricating media 120 rises such that portions of the mechanical assembly 100 are submerged, then continued operation of the mechanical assembly 100 could excessively churn and thereby further heat the lubricating media 120, as well as the mechanical assembly 100 components to potentially destructive levels. However, the heat from the lubricating media 120 causes the passive drain valve 500 to actuate open, thus preventing the accumulating lubricating media 120 from reaching the mechanical assembly 100. Under this combination of conditions, the mechanical assembly 100 will not be submerged in hazardous lubricating media 120. In some cases, a supplemental source of lubrication may be provided to ensure a sufficient supply of lubricating media 120 to avoid damage to the mechanical assembly in the ON state.

Figure 7A:
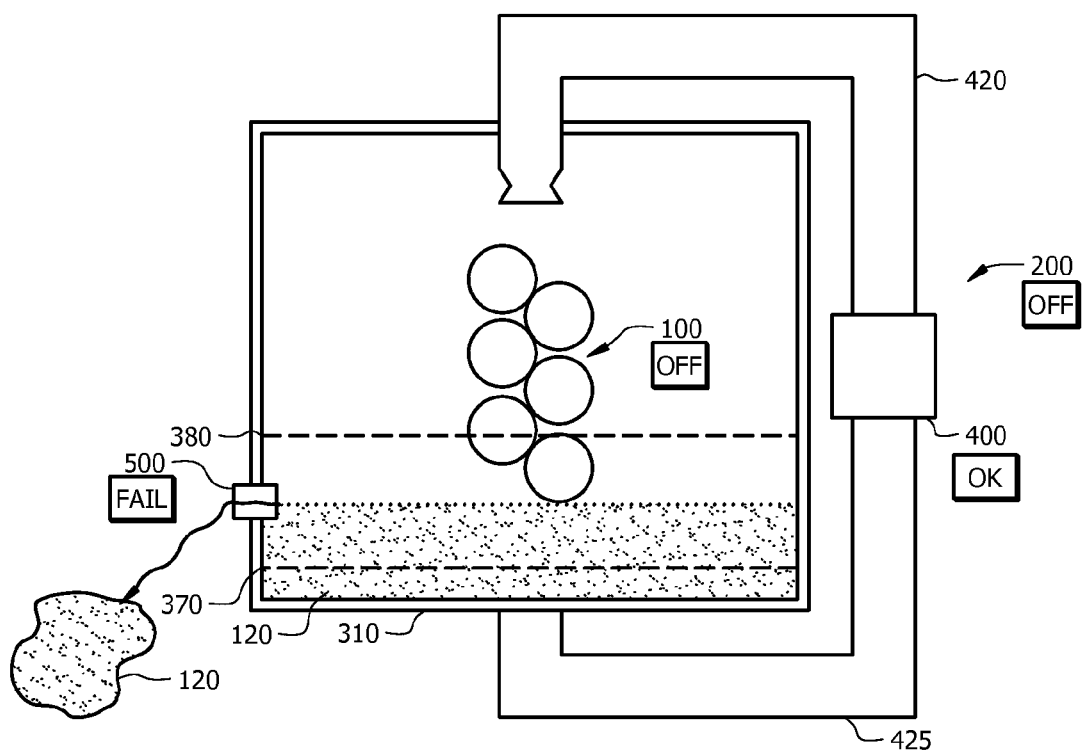
FIG. 7A depicts a side cutaway view of a lubrication system in the OFF state in which the drain valve has FAILED according to an embodiment of the present disclosure.
Figure 7B:
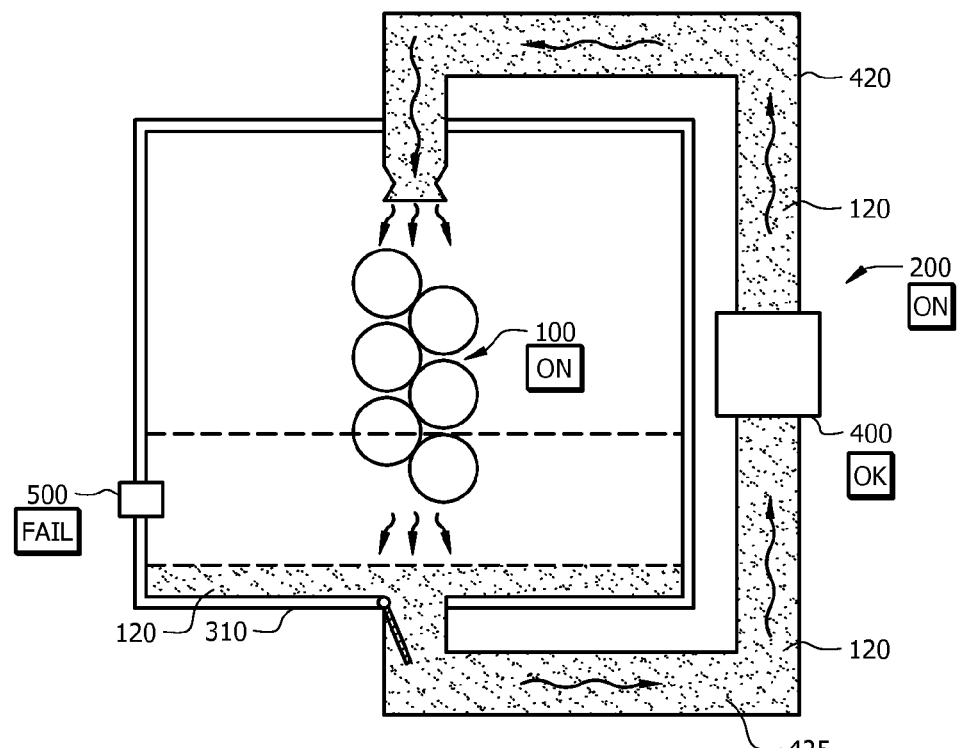
FIG. 7B depicts a side cutaway view of a lubrication system in the ON state in which the drain valve has FAILED according to an embodiment of the present disclosure.

FIGS. 7A and 7B illustrate conditions in which the drain valve 500 has FAILED. In an embodiment, the drain valve 500 is constructed to fail in the open position. Referring to FIG. 7A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. Unlike the conditions of FIG. 5A and FIG. 6A, the lubricating media 120 only accumulates to a level coinciding with the location of the failed drain valve 500, as the open valve 500 permits some of the lubricating media 120 to drain outside of the collection area 300. In an embodiment, the presence of drained lubricating media 120 (perhaps pooled on the ground or other surface proximate to or under the lubrication system 200) may provide an indirect visual indicator to an operator, maintainer, or other person that the drain valve 500 has failed and requires replacement prior to turning the lubrication system 200 and mechanical assembly 100 ON. In an embodiment, visual indication of a low oil level on an oil level-monitoring device may provide notification that the drain valve 500 has failed and requires replacement prior to turning the lubrication system 200 and mechanical assembly 100 ON.

Referring now to FIG. 7B, the mechanical assembly 100 and lubrication system 200 are shown in an ON state. The pumping system 400 operates to withdraw lubricating media 120 from the collection area 300 through withdrawal location 450 into suction line 425, and then transports the lubricating media 120 through discharge conduit 420 to distribution location 440. The lubricating media 120 is thereby distributed via distribution mechanism 460 to a mechanical assembly 100 located within collection area 300. The lubricating media 120 then drips down from mechanical assembly 100 and collects proximate to bottom 310 of housing 305. Because the pumping system 400 continuously withdraws a substantial portion of the lubricating media 120 from the bottom 310 of the housing 305 of collection area 300, the lubricating media 120 only rises to a dynamic operating level 370 that is lower than the failed valve 500. Under this combination of conditions, an unsubstantial amount of lubricating media 120 may escape, and the mechanical assembly 100 is adequately lubricated and cooled, resulting in no damage.

Figure 8A:
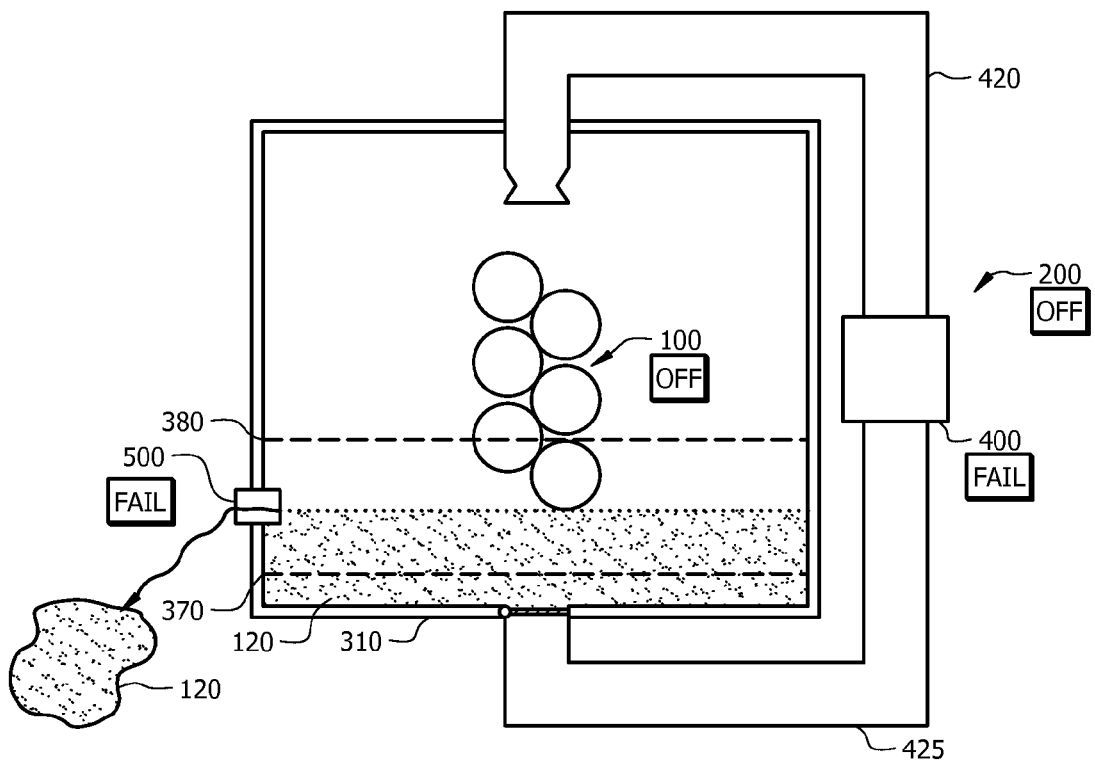
FIG. 8A depicts a side cutaway view of a lubrication system in the OFF state in which both the pumping system and the drain valve have FAILED according to an embodiment of the present disclosure.
Figure 8B:
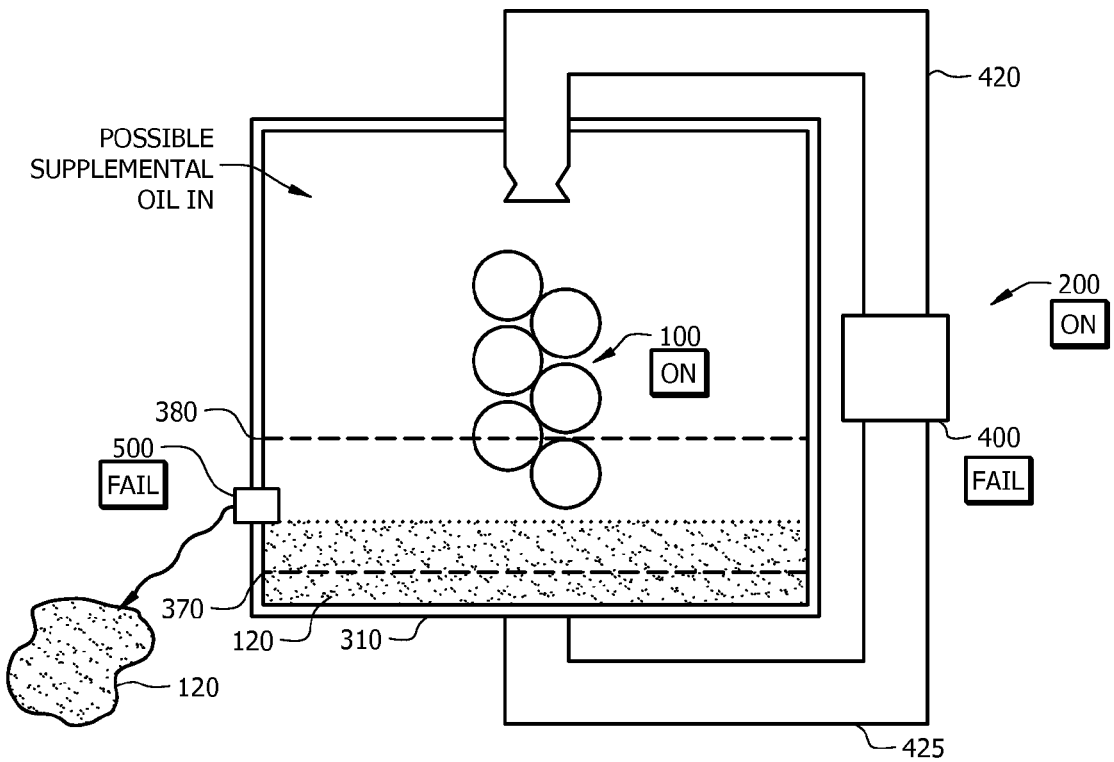
FIG. 8B depicts a side cutaway view of a lubrication system in the ON state in which both the pumping system and the drain valve have FAILED according to an embodiment of the present disclosure.

FIGS. 8A and 8B illustrate conditions in which both the pumping system 400 and the drain valve 500 have FAILED. Referring to FIG. 8A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. Unlike the conditions of FIG. 5A and FIG. 6A, the lubricating media 120 only accumulates to a level coinciding with the location of the failed drain valve 500, as it permits some of the lubricating media 120 to drain outside of the collection area 300. In an embodiment, the presence of drained lubricating media 120 (perhaps pooled on the ground or other surface proximate to or under the lubrication system 200) may provide an indirect visual indicator to an operator, maintainer, or other person that the drain valve 500 has failed and requires replacement prior to turning the lubrication system 200 and mechanical assembly 100 ON.

Referring now to FIG. 8B, the mechanical assembly 100 and lubrication system 200 are shown in an ON state. The pumping system 400 had FAILED and is unable to pump lubricating media 120 from the collection area 300, thus hot lubricating media 120 accumulates and rises toward the mechanical assembly 100. However, the hot lubricating media 120 is prevented from reaching the mechanical assembly 100 as the failed drain valve 500 permits some of the lubricating media 120 to drain outside of the collection area 300. Under this combination of conditions, the mechanical assembly 100 will not be submerged in hazardous lubricating media 120. In some cases, a supplemental source of lubrication may be provided to ensure a sufficient supply of lubricating media 120 to avoid damage to the mechanical assembly in the ON state.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, and/or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A lubrication system, comprising:
    a collection area for collecting lubricating media;
    a pumping system for transporting the lubricating media from a withdrawal location of the collection area to a distribution location of the collection area;
    wherein the lubricating media collects in the collection area to a static level when the pumping system is off and to a dynamic level when the pumping system is on;
    a drain valve located between the static level and the dynamic level, the drain valve operable to open to drain a portion of the lubricating media in response to the lubricating media reaching a predefined threshold temperature and level, wherein the drain valve will fail open in the event of failure;
    a spring arranged to provide an altering spring rate to unseal a valve seat opening; and
    a material that changes phase or volume at a predetermined threshold temperature, the material provided in at least one of:
    inside the spring, the spring surrounding a central portion of a piston;
    between a plunger at a first end of the material and washers at a second end of the material opposite the first end of the material, wherein the spring is provided to act against the cause a valve plug and the piston to move toward the first end of the material; and
    between the plunger and an end of an inner chamber, the plunger positioned between the inner chamber and the spring, wherein the spring exerts a first force acting against a wall at a first end of the spring and exerts a second force acting directly against the plunger at a second end of the spring opposite the first end of the spring.

2. The lubrication system according to claim 1, wherein the material is selected from the group consisting of: a eutectic material or a bi-metallic material.

3. The lubrication system according to claim 1, wherein the lubrication system retains a significant portion of the lubricating media and remains temporarily operable in the event of valve failure.

4. A lubrication system, comprising:
    a collection area for collecting lubricating media;
    a pumping system for transporting the lubricating media from a withdrawal location of the collection area to a distribution location of the collection area;
    a drain valve located above the normal operating level of the lubricating media, the drain valve operable to open to drain a portion of the lubricating media in response to the lubricating media reaching a predefined threshold temperature and level; and
    a material that changes phase or volume at a predetermined threshold temperature, wherein openings in or around a plunger are provided to accept a flow of the material, the material provided in at least one of:
    inside a spring, the spring surrounding a central portion of a piston of the plunger;
    between the plunger at a first end of the material and washers at a second end of the material opposite the first end of the material, wherein the spring is provided to act against the and cause a valve plug and the piston to move toward the first end of the material; and
    between the plunger and an end of an inner chamber, the plunger positioned between the inner chamber and the spring, wherein the spring exerts a first force acting against a wall at a first end of the spring and exerts a second force acting directly against the plunger at a second end of the spring opposite the first end of the spring.

5. The lubrication system according to claim 4, wherein the material is selected from the group consisting of: a eutectic material and a bi-metallic material.

6. The lubrication system according to claim 4, wherein the drain valve will fail open in the event of failure.

7. The lubrication system according to claim 6, wherein the lubrication system retains a significant portion of the lubricating media and remains temporarily operable in the event of valve failure.

8. A lubrication system, comprising:
    a drain valve coupled to a collection area for collecting lubricating media;
    a material that changes phase or volume at a predefined threshold temperature, wherein the drain valve opens to drain a portion of the lubricating media from the collection area in response to the material reaching the predefined threshold temperature; and
    openings in or around a plunger provided to accept a flow of the material, the material provided in at least one of:
    inside a spring, the spring surrounding a central portion of a piston of the plunger;
    between the plunger at a first end of the material and washers at a second end of the material opposite the first end of the material, wherein the spring is provided to act against the plunger and cause a valve plug and the piston to move toward the first end of the material; and between the plunger and an end of an inner chamber, the plunger positioned between the inner chamber and the spring, wherein the spring exerts a first force acting against a wall at a first end of the spring and exerts a second force acting directly against the plunger at a second end of the spring opposite the first end of the spring.

9. The lubrication system according to claim 8, wherein the drain valve further comprises:

a casing with a valve seat opening; and a valve plug, wherein the valve plug seals with the valve seat opening to close the drain valve when the temperature of the material is below the predefined threshold temperature; and wherein the valve plug unseals from the valve seat opening to open the drain valve when the temperature of the material is at or above the predefined threshold temperature.

10. The lubrication system according to claim 9, wherein the spring biases the valve plug to unseal from the valve seat opening to open the drain valve when the temperature of the material is at or above the predefined threshold temperature.

11. The lubrication system according to claim 9, wherein the material is physically prevented from exiting the valve seat opening.

12. The lubrication system according to claim 8, wherein the drain valve is designed to fail open.

\* \* \* \* \*